United States Patent Office 3,146,115
Patented Aug. 25, 1964

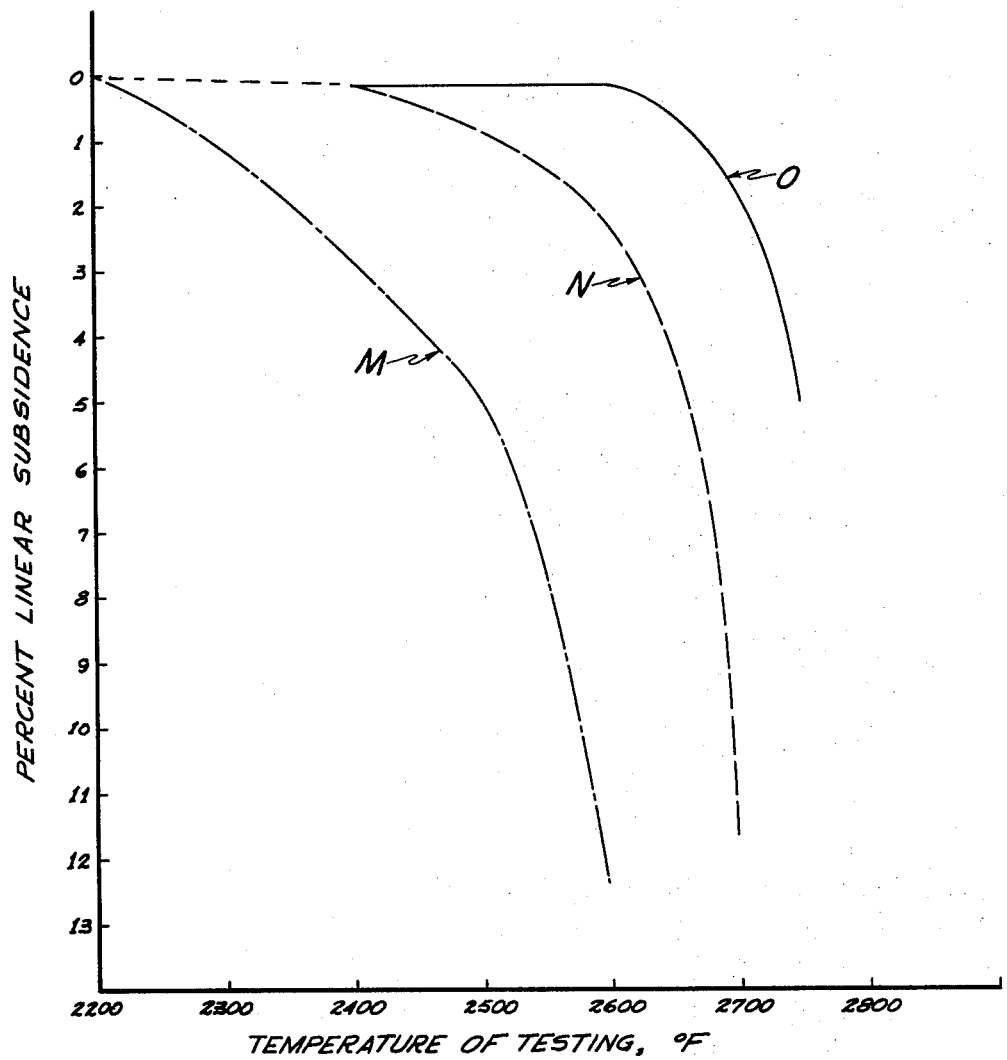

3,146,115
REFRACTORY BRICK
Berhl E. Wishon, Raymond E. Birch, and Donald F. Stock, Pittsburgh, Pa., assignors to Harbison-Walker Refractories Company, Pittsburgh, Pa., a corporation of Pennsylvania
Filed Apr. 5, 1962, Ser. No. 185,443
14 Claims. (Cl. 106—67)

This invention relates to refractory brick and, more particularly, to improved semi-silica fireclay brick. Semi-silica fireclay brick is defined by the ASTM as fireclay brick with not less than 72% silica. They are required to have a modulus of rupture of 300 p.s.i. minimum, and a load test subsidence in 90 minutes at 2460° F. of not over 1.5% with an applied load of 25 p.s.i. While there is no specific upper limit on the silica inclusion those skilled in the art consider it to about 80%. Higher $SiO_2$ content appears to produce brick with more thermal expansion than desired.

Semi-silica brick are recognized for certain excellent characteristics, among which are their ability to withstand soaking heats and attack by alkalies.

However, as metallurgical processes have undertaken operations at considerably higher tempertures, their limit of usefulness has been passed. While adequate at lower temperatures, their lack of high temperature load strength has become an increasing problem. One example in which higher temperatures have caused difficulty with previously available semi-silica brick is in the blast furnace stove.

Of the various types of semi-silica brick previously available, "Jersey Clay brick," is notable as one economically made from naturally-occurring siliceous clays. However, these brick lack the desired load strength for the higher temperatures now needed in industry. Where siliceous clays are not available, some workers have made a "synthetic" semi-silica brick by combining clays of lower silica content (such as kaolinitic clays having 50 to 60% $SiO_2$, ignition-free basis) with fine pure sand or other forms of high purity quartz, to achieve a product equivalent in final silica content to other semi-silica brick. Such synthetic semi-silica brick were superior to the Jersey clay brick in some respects, but their tendency for slow permanent expansion or growth at the increased temperatures of modern metallurgical operation, particularly in the steel industry, prevents their full use.

Accordingly, it is an object of this invention to provide improved semi-silica brick, which brick have increased mechanical strength, and high temperature load strength (or resistance to subsidence) at temperatures extending substantially higher than the maximum at which prior semi-silica brick have been serviceable. It is another object of this invention to provide improved semi-silica brick using relatively inexpensive and commercially available raw materials without recourse to the use of added quartz, with its demonstrated disadvantages.

Briefly, in one embodiment, improved semi-silica brick according to the concepts of this invention, are fabricated from 85% of a mixture of crude and calcined siliceous fireclay, such as siliceous kaolin, on a 51 and 34, by weight, ratio, and about 15% of relatively coarse pyrophyllite. The mixture is tempered with activated water, pressed or shaped into brick in a conventional manner and fired at about cone 15 (2550° F.).

A better understanding of the invention will be had from the following discussion with reference to drawing. The drawing is a comparative plot of prior semi-silica brick and brick according to this invention.

As noted above, previous commercially available semi-silica brick made of siliceous clays had certain outstanding properties which however became greatly limited at higher temperature. The addition of less siliceous plastic clays appeared to provide some improvement in mechanical strength but not without some small loss in refractoriness. This appeared satisfactory for furnaces operated at low temperatures, but with the increased output which present technology demands, each additional 50° F. of refractoriness that can be obtained in a semi-silica brick is important, and the loss of refractoriness attendant plastic clay additions is no longer acceptable for contemporary higher operating temperatures.

We have discovered that small additions of crude pyrophyllite ($Al_2O_3.4SiO_2.H_2O$; $Al_2O_3$, 28.3%; $SiO_2$, 66.7%; $H_2O$, 5%) provide improved load strength to considerably higher temperatures with no sacrifice in any of the other desirable properties for a semi-silica brick. The result is an effective increase in refractoriness, the products being usable to higher temperatures than prior semi-silica brick, and allowing furnace operation to proceed to higher temperatures.

Three mixes according to this invention and containing pyrophyllite within our preferred range, showed over 70% improvement in mechanical strength. Whereas, semi-silica brick as a class have been allowed a subsidence up to 1.5% at 2460° F. in a laboratory load test (25 p.s.i. for 20 minutes), our brick did not subside this much even at 2700° F.

Pyrophyllite is a crystalline mineral belonging to the rhombic or monoclinic system. It is a hydrous aluminum silicate of the general formula and percentage makeup as set forth above. There are three different types of pyrophyllite; namely, the foliated, the radiated granular, and the massive. Previous workers in the refractory art have recognized pyrophyllite as a useful material. Most of these workers have suggested major amounts i.e., 75% and above, of pyrophyllite with minor additions of a bonding agent. For instance, kaolinitic clays and a flux such as feldspar have been suggested in combination with pyrophyllite for the fabrication of a refractory brick.

In contrast, we have discovered that only small amounts of pyrophyllite are useful in producing highly successful semi-silica brick when mixed with major amounts of siliceous clays substantially free of alkalies and coarse silica. Low alkali content is widely recognized as one of the preferable characteristics of semi-silica brick. Three mixes (B, C and D) were made according to this discovery with 15 to 25% of —16 mesh or —¼ mesh pyrophyllite and 85 to 75% of a mixture of natural and calcined siliceous clays. Mix A was a control mix made in the same way but with no pyrophyllite. All mixes used water as a tempering liquid. Brick were formed from the mixes and burned to cone 15 (2550° F.) in a laboratory periodic kiln.

Tests on such brick indicated that higher density, considerably increased mechanical strength, and lower porosity resulted from the minor addition of pyrophyllite to the mixture of siliceous fireclay material. Load tests were also conducted and indicated considerable improvement over previous semi-silica brick made from naturally-occurring siliceous materials, and amazing dimensional stability in extended load tests. The following table sets forth in condensed form the results of some of our laboratory tests. In the table, Mix E is a previously commercial semi-silica brick mix containing about 75% silica on a calcined basis.

*Table I*

| Mix number | A | B | C | D | E |
|---|---|---|---|---|---|
| Mix: | | | | | |
| Calcined siliceous clay, percent | 40 | 34 | 30 | 30 | |
| Crude siliceous clay, percent | 60 | 51 | 45 | 45 | |
| Total | | 85 | 75 | 75 | |
| Pyrophyllite, −16 mesh | | 15 | 25 | | |
| Pyrophyllite, −¼ mesh | | | | 25 | |
| Burn, cone | 15 | 15 | 15 | 15 | 15 |
| Linear change in burning, percent | +0.6 | +0.4 | +0.4 | +0.6 | |
| Bulk density, p.c.f. (av. 17) | 115 | 118 | 116 | 118 | 117 |
| Modulus of rupture, p.s.i. (av. 5) | 350 | 600 | 600 | 570 | 300 |
| Apparent porosity (av. 5), percent | 29.0 | 27.1 | 28.3 | 27.6 | 30.0 |
| Reheat 2730° F. (1500° C.) (av. 3), linear change, percent | +0.1 | +1.2 | +1.3 | +1.3 | −0.4 |
| Load test, 25 p.s.i., 90 minutes, linear subsidence at 2640° F, percent | 0.6 | 0.1 | 0.1 | 0.1 | 2.7 |
| Chemical analysis (on an oxide basis), percent: | | | | | |
| Silica (SiO$_2$) | 76.9 | 77.9 | 78.2 | 78.1 | 76.9 |
| Soda (Na$_2$O) | 0.00 | 0.02 | 0.04 | 0.02 | 0.1 |
| Potash (K$_2$O) | 0.04 | 0.04 | 0.02 | 0.01 | 0.1 |
| Lithia (Li$_2$O) | 0.01 | 0.00 | 0.02 | 0.04 | |
| P.C.E., cone | 29–31 | 29 | 27–29 | 29 | 27 |

What is particularly remarkable about the above laboratory test results is the dramatic reduction in linear subsidence under high temperature load tests when pyrophyllite is added to a siliceous clay mix. Also of significance is the almost 100% increase in the modulus of rupture.

Table II is a screen analysis of the mixtures A through D of Table I.

*Table II*

| Mix | A | B | C | D |
|---|---|---|---|---|
| Screen analysis: | | | | |
| Held on 10 mesh | TR | TR | TR | TR |
| Held on 28 mesh, percent | 10 | 12 | 8 | 13 |
| Held on 65 mesh | 18 | 15 | 15 | 13 |
| Pass 150 mesh | 72 | 73 | 77 | 71 |

The crude siliceous clay used in the Mixes A through D was as received from the mine, the calcined siliceous clay was all −10 mesh, and the pyrophyllite was as indicated in Table I. The relative amounts of calcined clay and crude clay, which were combined with the pyrophyllite, were such as to result in the screen analysis of Table II.

Detailing the manufacture of the brick of Table I: the materials were combined in the proportions listed and mixed together in a Clearfield mixer for about 5 minutes dry and about 10 minutes wet. Mix A had about a 10.6%, by weight, moisture content, Mix B about 7.8%, by weight, Mix C about 9.6%, by weight, and Mix D about 8.5%, by weight.

The mixes were observed to contain several small lumps of the crude clay which did not break down mixing. These lumps were noticeable in the cross section of the brick but were absent from the surface of the brick. The brick were well filled out, strong, and free from pressure cracks thereby providing very good comparative test specimens. The forming pressure for the brick was 4000 p.s.i. in the mixes containing about 15% pyrophyllite and about 2500 p.s.i. in the mixes containing about 25% pyrophyllite, these being the ordinary adjustments which would be made by a press operator to suit the pressure to the mix. In the burning, the brick were placed in a laboratory kiln and subjected to a 50° F. per hour firing schedule to about 2550° F. (cone 15), and subjected to a 10-hour hold once this temperature was obtained.

The following table sets forth on an oxide basis a typical analysis of the materials used in Mixes A through D of Table I.

*Table III*

| | Pyrophyllite As Mined | Calcined Siliceous Clay | Crude Siliceous Clay | Mix E |
|---|---|---|---|---|
| Chemical Analysis, Percent: | | | | |
| Silica (SiO$_2$) | 76.3 | 77.7 | 69.6 | 76.6 |
| Alumina (Al$_2$O$_3$) | 18.2 | 20.4 | 20.5 | 21.0 |
| Titania (TiO$_2$) | 0.3 | 1.2 | 1.5 | 1.3 |
| Iron oxide (Fe$_2$O$_3$) | 0.8 | 0.4 | 0.7 | 0.7 |
| Lime (CaO) | 0.2 | 0.1 | 0.2 | 0.1 |
| Magnesia (MgO) | 0.1 | 0.1 | 0.02 | 0.1 |
| Alkalies | 0.2 | 0.04 | 0.17 | 0.2 |
| Ignition loss | 3.7 | | 7.3 | |

As was mentioned above, in making semi-silica brick according to this invention, it is undesirable to add free silica as quartz in any of its forms. One might suppose that a few percent might not do too much harm, but for best results it is undesirable. If such is present, it should be extremely fine (−65 mesh) with most even finer (−150 mesh). Included silica of larger amounts or of a coarser nature (as in synthetic semi-silica brick compounded from quartz and kaolinitic clay) results in punky brick frequently lacking strength and thermal shock resistance, and subjecting the user to very serious problems of expansion as the quartz progressively converts to high temperature crystalline forms.

Also, it is important that the alkali content of the brick be very low, preferably less than about .25% by weight.

Although water is the normal tempering agent for preparing the brick batch for the press, it is sometimes advisable to modify its action by the methods well known to those who make refractory brick. Concentrated sulfite waste liquor may be used in complete or partial replacement of the water. Likewise, the action of the water may be altered by control of its pH, as is common knowledge. Alkaline additions such as small amounts of sodium hydroxide may be used, or conversely, small amounts of acids or acid salts may be used with the water. In this group are included aluminum sulphate, sulphuric acid, ferric chloride and others. We use about 1 part, by weight, of such a fluid.

The pyrophyllite used in our mix must be crude and can not be a calcined material since calcined pyrophyllite appears to lack the desired strength imparting characteristics in our semi-silica brick. While we have shown exemplary test mixes using 15 and 25% additions of pyrophyllite, we have found that additions of from 10 to 30%, by weight, to a mixture of calcined and crude siliceous clay are also satisfactory.

Load tests of a very special nature were devised to explore more fully the gains made by our invention. The load test data of Table I were obtained by a 90-minute application of a 25 p.s.i. load as required in ASTM tests for semi-silica brick, but with severity increased by using a temperature of 2640° F. instead of 2460° F. (1500° C. vs. 1400° C.). To increase the severity still more, and to more fully measure the results of our improvement, the 25 p.s.i. loading was applied at a series of temperatures increased in 100° F. increments, and in each case with the load held for 24 hours, or 16 times as long as in the ASTM test.

In the results tabulated below, M is a common type of "Jersey" semi-silica brick, N is the type of siliceous clay base mix with which we worked in seeking an improved product (Mix A or Table I), and O is the product of our invention, made by the methods described herein, and in particular by using an addition of 25% pyrophyllite to the base mix represented by N (Mix D of Table I).

Table IV

| | M | N | O |
|---|---|---|---|
| Linear subsidence after 24 hrs., under 25 p.s.i. at— | Percent | Percent | Percent |
| 2200° F | 0.1 | | |
| 2400° F | 2.5 | 0.0 | 0.0 |
| 2600° F | 12.5 | 2.2 | 0.0 |
| 2700° F | Failed | 11.5 | 1.3 |
| 2750° F | Failed | Failed | 5.0 |

As these data strikingly reveal, the brick of our invention showed only 1.8% linear subsidence after 24 hours under load at 2700° F., whereas a common type of semi-silica brick of recognized good quality had subsided more than this at 2400° F. This provides a good measure of the improvement achieved by our invention. This data is plotted in the drawing to more strikingly illustrate the improved character of brick according to our invention.

As in the manufacture of all burned refractories, the burning process is utilized to accomplish mineral alterations and to give the product a permanent ceramic bond, so that their strength will be adequate for shipment and use without breakage. For certain of our examples, the burning temperature was 2550° F. (cone 15), this usually being preferred for those particular compositions. Somewhat lower or higher temperatures would alter the properties without destroying the usefulness of our invention. We regard 2350 to 2700° F. as being about the extent of the useful firing range.

Having thus set forth sufficient explanation and exemplary data as to enable those skilled in the art to practice our invention, we wish it understood we do not wish to be limited thereby, but rather that the true measure of the scope of our invention be as set forth in the following claims.

We claim:

1. An improved semi-silica brick made from a batch consisting essentially of from 70 to 90%, by weight, of siliceous clay, and from about 30 to 10%, by weight, of crude pyrophyllite, said brick being burned.

2. The brick of claim 1 made from a batch in which the pyrophyllite is all from about —¼ inch to —16 mesh.

3. The brick of claim 1 made from a batch in which the siliceous clay is a mixture of a minor portion of a calcined clay and a major portion of crude siliceous clay.

4. An improved semi-silica brick made from a batch consisting essentially of from 70 to 90%, by weight, of a mixture of crude and calcined siliceous clay, from about 30 to 10%, by weight, of from —¼ inch to —16 mesh crude pyrophyllite, and about one part, by weight, of a tempering fluid, said brick being burned.

5. An improved semi-silica brick made from a batch consisting essentially of from 70 to 90%, by weight, of a mixture of calcined and crude siliceous clay, said mixture being substantially free of alkalies, and from about 30 to 10%, by weight, of —¼ inch to —16 mesh crude pyrophyllite, said brick being burned at about cone 15.

6. The brick of claim 5 made from a batch in which the mixture of calcined and crude siliceous clay is substantially all —3+65 mesh.

7. An improved semi-silica brick made from a batch consisting essentially of from 70 to 90%, by weight, of a mixture of calcined and crude siliceous clay, said mixture being substantially free of alkalies, and from about 30 to 10%, by weight, of —¼ inch to —16 mesh crude pyrophyllite, and about one part, by weight, of a tempering fluid, said brick being burned at about cone 15.

8. The brick of claim 7 made from a batch in which the mixture of crude and calcined siliceous clay is on a 51 and 34%, by weight, ratio.

9. An improved semi-silica brick made from a batch consisting essentially of from 75 to 85%, by weight, of siliceous clay, and from about 25 to 15%, by weight, of crude pyrophyllite, said brick burned at a temperature in the range of from about 2350 to 2700° F.

10. An improved semi-silica brick made from a batch consisting essentially of from 75 to 85%, by weight, of siliceous clay, said mixture being substantially free of alkalies, and from about 25 to 15%, by weight, of crude pyrophyllite, said brick burned at about cone 15.

11. A size graded, refractory brickmaking batch, for fabricating improved semi-silica refractory shapes, consisting essentially of from 70 to 90%, by weight, of a mixture of calcined and crude siliceous clay, said mixture having less than about 0.25% alkalies, by weight, and from about 30 to 10%, by weight, of —¼ inch to —16 mesh crude pyrophyllite, said mixture of calcined and crude siliceous clay substantially all passing a 10 mesh screen, and sufficient tempering media as to allow forming.

12. The batch of claim 11 in which the crude pyrophyllite amounts to between 25 and 15%, by weight, of the batch.

13. The batch of claim 11 in which the mixture is comprised of a minor portion of calcined siliceous clay and a major portion of crude siliceous clay.

14. The batch of claim 11 in which the total $SiO_2$ content is on the order of about 75%, by weight, and on the basis of an oxide analysis.

References Cited in the file of this patent

UNITED STATES PATENTS

| 1,973,434 | Harvey et al. | Sept. 11, 1934 |
| 2,384,180 | Kraner | Sept. 4, 1945 |
| 2,543,548 | Henry et al. | Feb. 27, 1951 |